(12) United States Patent
Bankston

(10) Patent No.: US 6,679,199 B2
(45) Date of Patent: Jan. 20, 2004

(54) TAG AND RELEASE DEVICE

(76) Inventor: Parker Bankston, 2436 N. Federal Hwy., Suite 404, Lighthouse Point, FL (US) 34994

( * ) Notice: Subject to any disclaimer, the term of this patent is extended or adjusted under 35 U.S.C. 154(b) by 0 days.

(21) Appl. No.: 10/283,296

(22) Filed: Oct. 30, 2002

(65) Prior Publication Data

US 2003/0079696 A1 May 1, 2003

Related U.S. Application Data

(60) Provisional application No. 60/330,744, filed on Oct. 30, 2001.

(51) Int. Cl.[7] ............................................. A62B 35/00
(52) U.S. Cl. ......................... 119/858; 119/712; 119/3; 606/116; 606/117; 43/1; 43/4; 40/300; 40/301; 40/302; 227/67; 227/68; 128/330; 604/62; 604/308
(58) Field of Search ................................. 119/858, 712, 119/3; 606/116, 117; 43/1, 4; 40/300, 301, 302; 227/67, 68; 128/330; 604/62, 308; 30/334; 156/DIG. 23

(56) References Cited

U.S. PATENT DOCUMENTS

| 1,759,400 | A | * | 5/1930 | Hobbs | |
| 2,729,177 | A | * | 1/1956 | Flood | |
| 3,850,360 | A | * | 11/1974 | Ritchey | 227/67 |
| 4,506,670 | A | * | 3/1985 | Crossley | 128/334 |
| 4,920,670 | A | * | 5/1990 | Amick | 40/300 |
| 4,943,294 | A | * | 7/1990 | Knapp | 606/117 |
| 5,497,930 | A | * | 3/1996 | Kubota | 227/67 |
| 5,826,775 | A | * | 10/1998 | Mooney et al. | 227/67 |
| 6,053,926 | A | * | 4/2000 | Luehrs et al. | 606/117 |
| 6,179,844 | B1 | * | 1/2001 | Underwood | 606/117 |
| 6,235,036 | B1 | * | 5/2001 | Gardner et al. | 606/117 |

FOREIGN PATENT DOCUMENTS

| EP | 0482902 A1 | * | 10/1991 | A01K/11/00 |
| EP | 0638480 A1 | * | 8/1994 | B65C/7/00 |
| GB | 2114045 A | * | 2/1983 | A01K/11/00 |

* cited by examiner

Primary Examiner—Peter M. Poon
Assistant Examiner—Andrea M. Valenti
(74) Attorney, Agent, or Firm—Browdy and Neimark, P.L.L.C.

(57) ABSTRACT

A device for safely tagging and releasing large fish includes a long pole to which is attached at its distal end a holder body for retaining therewithin an axially extending cutting blade and, at its tip portion, a tag applicator.

18 Claims, 2 Drawing Sheets

TAG AND RELEASE DEVICE

FIELD OF INVENTION

The present invention relates to the tagging of animals, particularly marine animals, e.g. large fish, and the safe release of such animals after they have been tagged; and, more particularly, a combination tag stick and release knife particularly adapted for the tagging and releasing of large game fish. The present text is based on and incorporates by reference provisional application 60/330,744, filed Oct. 30, 2001.

BACKGROUND OF THE INVENTION

For scientific purposes and also under certain conditions involving sports and tournament fishing, it is common practice to tag the fish with an identifying tag after the fish has been caught, and then release the fish to the water. Releasing the fish after tagging is sometimes dangerous as the fish involved, e.g. sharks, large billfish, can be very large and dangerous. The release procedure normally involves getting down close to the fish which is still in the water, while the fish is thrashing about, and cutting the line.

Tagging is often done at a safe distance with what is known commonly as a "tag stick", namely an elongated pole which carries at its distal end a sharp point on which is carried a removable barbed tag, held in place by a simple rubber band. The sharp end is jabbed into the animal, e.g. into a fin, and the point is then withdrawn leaving the tag.

It has been proposed to attach a cutting device near the distal end of a tag stick. Thus, the following text appeared at www.marlinmag.com (March 2001):

When fishing in tournaments or with dead bait, most boats try to limit the time they spend with fish in the leader so they can get back to trolling and get another fish. Instead of trying to get a sharp knife down close to a kicking billfish when cutting the leader alongside the boat, Nick Ewald and Capt. Bubba Carter on the Tijerta use a tag stick with a cutter attached to free fish faster and easier once a tag has been inserted.

To make the cutter, you first need to purchase a Sportsmans Release Knife . . . . In fact you should probably purchase more than one to make sure your crew has an emergency cutting tool on their person at all times. Cut the cutting head off the knife so that it will lie flat against your tag stick. Drill two or three holes along the back edge of the severed knife head to accommodate the lashing material of your choice. You can either use waxed floss or zip ties to secure the head to the stick. For extra security, lay a bead of marine adhesive (like 5200) along the tag stick to glue the knife head on before you lash it down or zip-tie it to the shaft.

Make sure that the lip that is formed at the back end of the knife (where the line enters) is sanded down smooth so light leaders won't catch.

This prior device is not necessarily intended to be used as a tag stick, but uses the tag stick pole as a mounting for the cutter. Moreover, such prior device is make-shift and not sufficiently sturdy. Attachment of the release knife head to the pole, then makes use of the pole as a tagging device difficult at best.

SUMMARY OF INVENTION

Accordingly, it is an object of the present invention to overcome deficiencies in the prior art, such as indicated above.

It is another object of the invention to increase the safety of persons who tag animals for scientific and sports purposes, e.g. the safety of crews and the fish when the fish is close to the boat, i.e. after the fish has been caught and brought close to the boat for tagging.

It is a further object of the present invention to provide a combined tag stick and release knife into a single structure, for improved, quicker and safer tagging and subsequent release of the fish.

It is yet a further object of the present invention to provide such a device which permits a quick changing of cutting blades using a standard carpet or carton knife blade commonly available.

The above and other objects and the nature and advantages of the present invention will be further understood from the following detailed description of an embodiment taken in conjunction with the drawing wherein:

BRIEF DESCRIPTION OF THE INVENTION

DETAILED DESCRIPTION OF EMBODIMENT(S)

Figure 1:
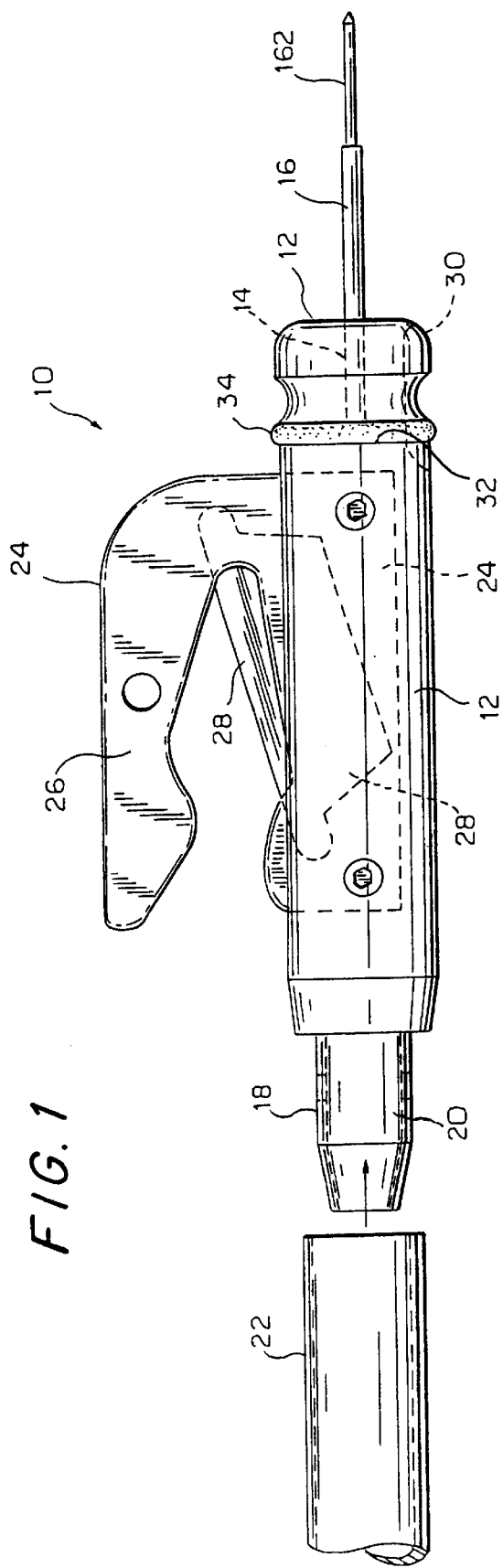
FIG. 1 is a side elevational view of an embodiment of a device in accordance with the present invention.
Figure 2:
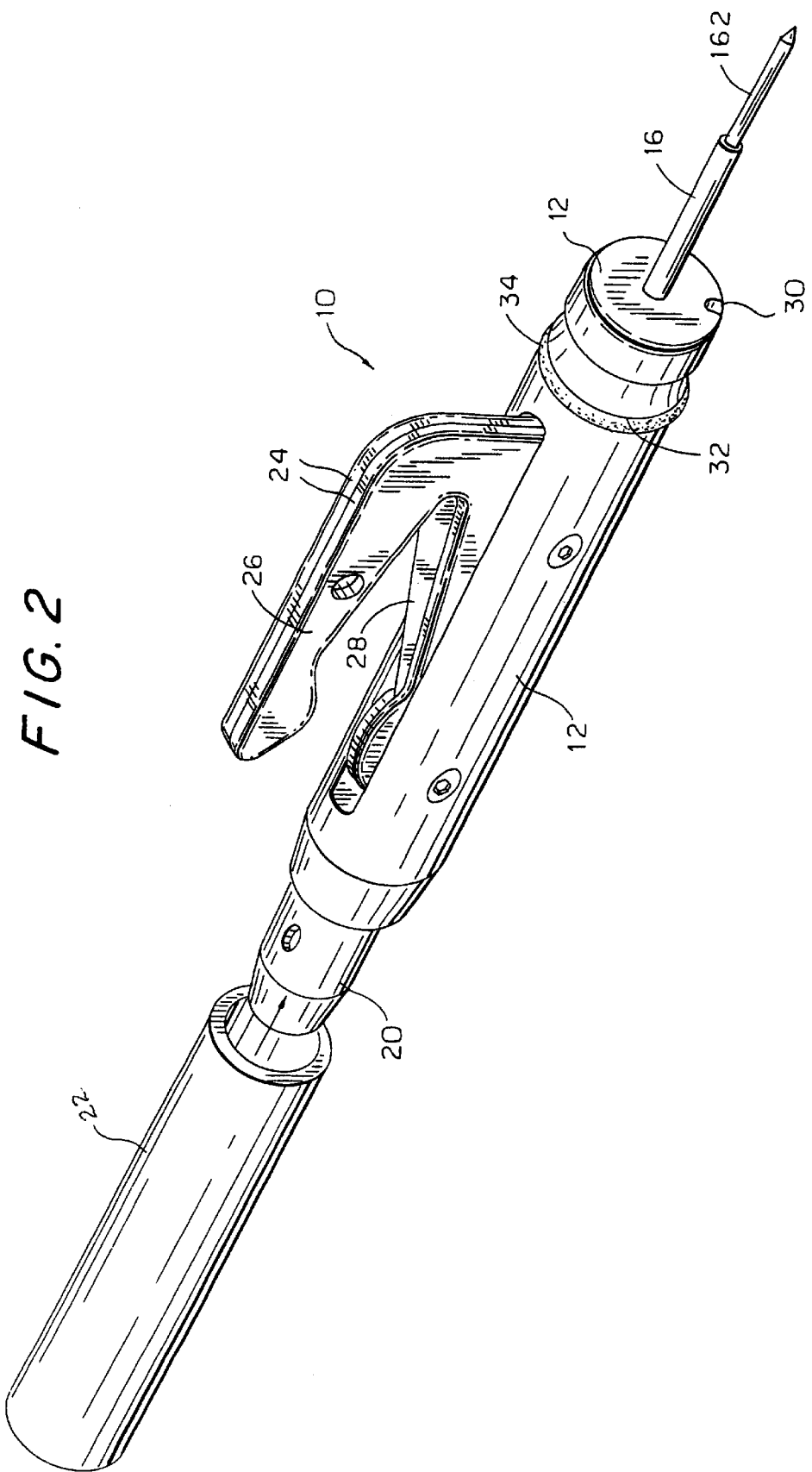
FIG. 2 is a perspective view thereof.

An embodiment 10 according to the present invention is shown in FIGS. 1 and 2 and comprises a generally cylindrical body 12 having an axially extending hole 14, preferably internally threaded, at its distal end for receiving a conventional tag applicator 16, preferably formed of stainless steel. At the opposite and proximal end 18, there is provided an elongated projection 20 as illustrated, provided for receiving the distal end of an elongated pole 22, preferably formed of aluminum provided with a protective coating, the pole 22 having a length of approximately 6 to 8 feet, e.g. 7 feet, six inches in one preferred embodiment, and 6 and 8 feet in two other preferred embodiments. The distal end of the elongated pole 22 is desirably pressure fit over the projection 20, whereby it is held solely by friction; however, an adhesive, e.g. an epoxy resin mixed with colloidal silica, e.g. Cabosil™, or a conventional marine adhesive may also be used in place of or to enhance the frictional retention.

Along the middle portion of the body 12 is provided a deep, narrow and elongated slot extending both axially and radially, opening to the surface of the body 12 and into which tightly fits a pair of generally U-shaped plates 24, side-by-side, only one of which is illustrated in FIG. 1, the second of which is hidden behind the first. One "arm" of each of the two U-shaped plates 24 is recessed within the aforementioned deep slot in the body 12, the second "arm" extending upwardly and outwardly in the proximal direction to form a hook-like structure 26.

Frictionally retained between the two plates 24 at an angle as illustrated is a cutting blade 28, with its cutting edge exposed. The blade 28, easily replaced by removal of the plates 24, is a common carpet or carton-cutting blade. The plates 24 are desirably held within the body 12 by bolts or screws, e.g. hex or square head bolts as illustrated, such bolts or screws extending through the body 12 and the plates 24 from one side of the body 12 to the opposite side.

The body 12 is also provided at its distal end thereof with a shallow axially extending groove 30 for receiving the tail portion of a conventional tag in the form of a strip, wire, tube or the like, not illustrated, the opposite distal end of such tail being attached to the barbed tag, itself retained on the tip 162 of the tag applicator 16. As the tag itself is conventional, it is not illustrated.

In order to hold the tag in place on the tag application tip 162, a circumferential groove 32 is provided near the distal end of the body 12, within which fits an O-ring 34, desirably elastic. In use, the O-ring 34 holds the tail of the tag, and thus the entire tag, in place until the barbed tag is implanted and thus retained in the fish or other animal. Upon removal of the device 10 from the fish or other animal, the tag remains in place and the tail of the tag either freely slides through the groove 30 or the O-ring 34 flexes sufficiently to permit escape of the tag tail.

The materials from which the aforementioned various elements are formed are preferably resistant to the effects of salt water, but it will be understood that such materials can be selected from a wide variety of materials. The body 12 may be die cast of stainless steel, aluminum or the like but is preferably formed of so-called "engineering" plastic such as polycarbonate, nylon or acetal resin, most preferably Delrin which is a very strong and hard plastic. The tag applicator 16 is preferably formed of stainless steel, although it also may be formed of other sufficiently hard materials, and the elastomeric O-ring is preferably formed of synthetic or natural rubber.

The pole 22 is preferably formed of fiber (e.g. carbon or glass fiber)—reinforced plastic or aluminum, as are the plates 24. In a preferred embodiment, the pole 22 is simply a commercially available aircraft tubing provided with a protective coating of epoxy resin impregnated with fiberglass, carbon fibers or Kevlar™ fibers.

The device of the present invention combines a tag stick with a release knife, and also allows for a quick change of blades using a standard carpet or carton knife blade, commonly available, or indeed any flat cutting blade. It is constructed of strong and corrosion resistant materials. It increases safety of the crews and the fish brought close to the boat.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A combined tag stick and release knife for tagging animals from a distance, comprising a body portion having a distal end and a proximal end, a tag applicator comprising a pointed tip adapted to penetrate a fish fin extending from said distal end of said body portion in an axial direction, an elongated pole a distal end and a proximal end, said distal end of said elongated pole extending from said proximal end of said body portion, the proximal end of said elongated pole being adapted to be grasped by a person, and a blade holder for a cutting blade extending along said body portion.

2. The device of claim 1 further comprising a tag strip groove extending from said distal end toward said proximal end of said body portion for retaining therewithin a tag tail or a tag strip.

3. The device of claim 2, wherein said blade holder comprises an axially extending groove within said body portion adapted for retaining the cutting blade.

4. The device of claim 2 further comprising a circumferential groove extending about said tag strip groove for retaining an O-ring therein.

5. The device of claim 4, wherein said blade holder comprises an axially extending groove within said body portion adapted for retaining the cutting blade.

6. The device of claim 1, wherein said blade holder comprises an axially extending groove within said body portion adapted for retaining the cutting blade.

7. The device of claim 1 further comprising a said cutting blade held by said blade holder.

8. The device of claim 7 further comprising a tag strip groove extending from said distal end of said body portion toward said proximal end of said body portion for retaining therewithin a tag tail or a tag strip.

9. The device of claim 8 further comprising a circumferential groove extending about said tag strip groove for retaining an 0-ring therein.

10. A combined tag stick and release knife for tagging animals from a distance, comprising a body portion having a distal end and a proximal end, a tag applicator extending from said distal end, an elongated pole extending from said proximal end, a blade holder for a cutting blade extending along said body, a tag strip groove extending from said distal end toward said proximal end for retaining therewithin a tag tail or a tag strip, a circumferential groove extending about said tag strip groove for retaining an O-ring therein, and an O-ring within said circumferential groove.

11. The device of claim 10, wherein said blade holder comprises an axially extending groove within said body adapted for retaining the cutting blade.

12. The device of claim 11, wherein said blade holder further comprises a pair of generally flat, generally U-shaped plates which are retained within said axially extending groove and which are adapted to hold the cutting blade frictionally therebetween.

13. A combined tag stick and release knife for tagging animals from a distance, comprising a body portion having a distal end and a proximal end, a tag applicator extending from said distal end, an elongated pole extending from said proximal end, and a blade holder for a blade extending along said body, wherein said blade holder comprises an axially extending groove within said body adapted for retaining the cutting blade and a pair of generally flat, generally U-shaped plates which are retained within said axially extending groove and which are adapted to hold the cutting blade frictionally therebetween.

14. A combined tag stick and release knife for tagging animals from a distance, comprising a body portion having a distal end and a proximal end, a tag applicator extending from said distal end, an elongated pole extending from said proximal end, a blade holder for a cutting blade extending along said body and a cutting blade held by said blade holder, a tag strip groove extending from said distal end toward said proximal end for retaining therewithin a tag tail or a tag strip, a circumferential groove extending about said tag strip groove for retaining an O-ring therein, and an O-ring within said circumferential groove.

15. The device of claim 14, wherein said blade holder comprises an axially extending groove within said body for retaining said cutting blade, and said cutting blade extends axially.

16. The device of claim 15, wherein said blade holder further comprises a pair of generally flat, generally U-shaped plates which are retained within said axially extending groove and which hold said axially extending cutting blade frictionally therebetween.

17. A combined tag stick and release knife for tagging animals from a distance, comprising a body portion having a distal end and a proximal end, a tag applicator extending from said distal end, an elongated pole extending from said proximal end, a blade holder for a cutting blade extending along said body, and a tag strip groove extending from said distal end toward said proximal end for retaining therewithin a tag tail or a tag strip, wherein said blade holder comprises an axially extending groove within said body adapted for retaining the cutting blade, and a pair of generally flat, generally U-shaped plates which are retained within said axially extending groove and which are adapted to hold the cutting blade frictionally therebetween.

18. A combined tag stick and release knife for tagging animals from a distance, comprising a body portion having a distal end and a proximal end, a tag applicator extending from said distal end, an elongated pole extending from said proximal end, a blade holder for a cutting blade extending along said body, a tag strip groove extending from said distal end toward said proximal end for retaining therewithin a tag tail or a tag strip, and a circumferential groove extending about said tag strip groove for retaining an 0-ring therein, wherein said blade holder comprises an axially extending groove within said body adapted for retaining the cutting blade and a pair of generally flat, generally U-shaped plates which are retained within said axially extending groove and which are adapted to hold the cutting blade frictionally therebetween.

* * * * *